Feb. 22, 1955   G. WALTHER, SR   2,702,613
BRAKE DRUM CONSTRUCTION
Filed Aug. 7, 1950   5 Sheets-Sheet 1

INVENTOR.
GEORGE WALTHER, SR.
BY
ATTORNEYS

Feb. 22, 1955 G. WALTHER, SR 2,702,613
BRAKE DRUM CONSTRUCTION
Filed Aug. 7, 1950 5 Sheets-Sheet 2

INVENTOR.
GEORGE WALTHER, SR.
BY
ATTORNEYS

Feb. 22, 1955　　　G. WALTHER, SR　　　2,702,613
BRAKE DRUM CONSTRUCTION
Filed Aug. 7, 1950　　　　　　　　　　　5 Sheets-Sheet 5

INVENTOR.
GEORGE WALTHER, SR.
BY
ATTORNEYS

United States Patent Office 2,702,613
Patented Feb. 22, 1955

2,702,613

BRAKE DRUM CONSTRUCTION

George Walther, Sr., Montgomery County, Ohio, assignor to The Dayton Steel Foundry Company, Dayton, Ohio, a corporation of Ohio Application August 7, 1950, Serial No. 178,015

3 Claims. (Cl. 188—218)

This invention relates to brake drums, and in particular to brake drums of improved qualities of heat transfer.

In the use of a lining of friction material composed of a metal alloy, the differential of thermal expansion between the lining and the drum becomes an important consideration, since if this effect is not compensated, serious buckling or rupture may occur.

By the present invention I provide a lining of this sort in which slots are provided in the edges of the band, to allow for thermal expansion, and improved cooling, and I have found that if these slots are inclined to the peripheral extent of the band, not only is the compensating action increased in efficiency, but that foreign matter which would tend to collect in the slots is automatically ejected continuously.

I have also found that the heat transfer is considerably enhanced, to maintain low temperatures in the drum, if copper elements are included as an integral part of the drum, either completely embedded in the body thereof, or extending outwardly of the drum in the form of fins.

It is therefore an object of the invention to provide an improved brake drum. A further object is to provide a brake lining having compensating features for the effects of thermal expansion. Other objects are to provide increased efficiency in compensating for thermal expansion in brake linings by a slotted structure which also accomplishes ejection of foreign matter automatically. It is also among the objects to provide brake drums of composite structure, having integral components affording a high rate of heat transfer. A still further object is to provide a method of making brake drums according to the foregoing objects.

These and other ends will be apparent to those skilled in the art, from the accompanying specification as illustrated in the drawings, in which.

Figure 5:
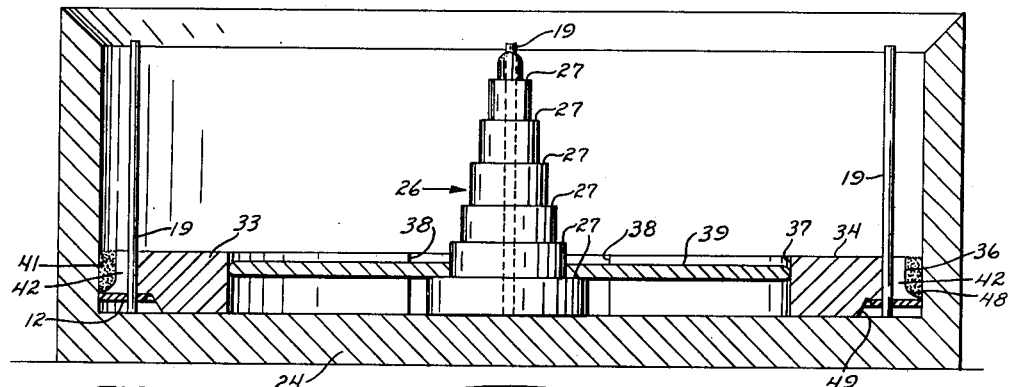
Figure 6:
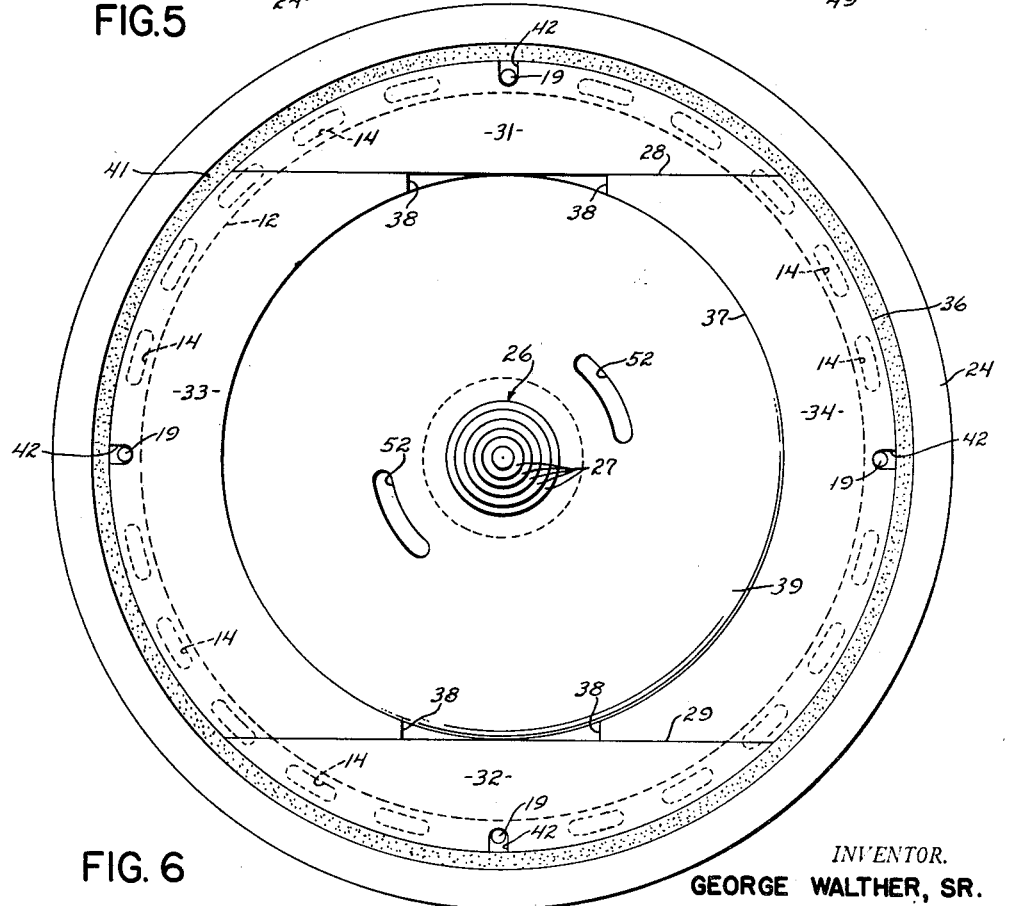
Figure 7:
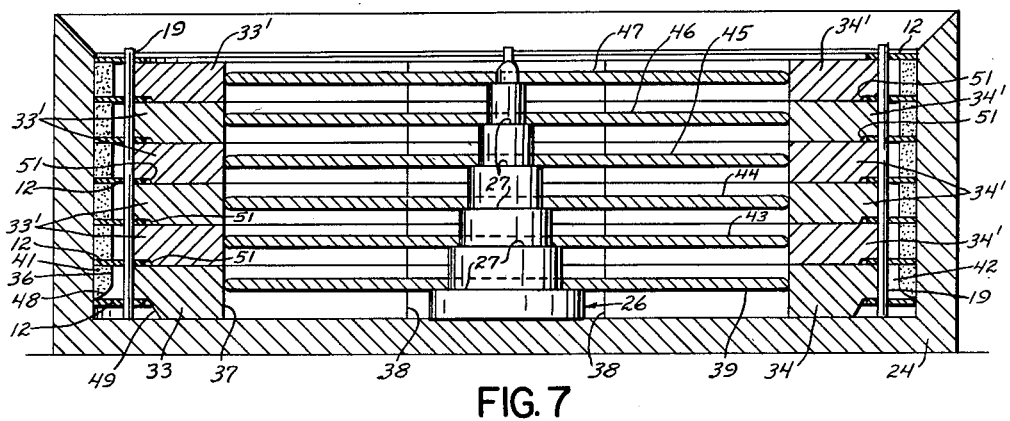
Figure 8:
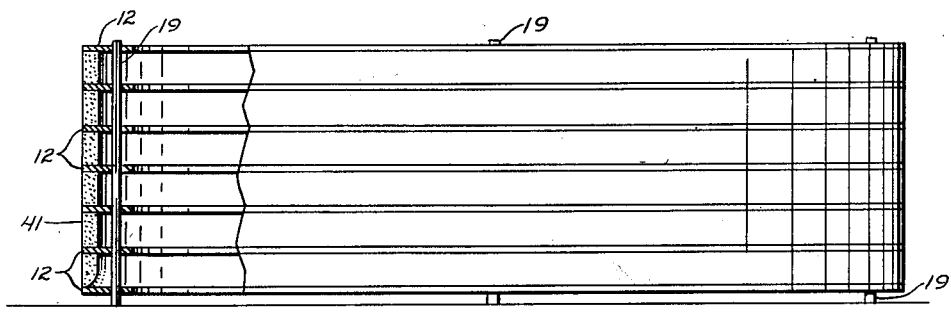
Figure 9:
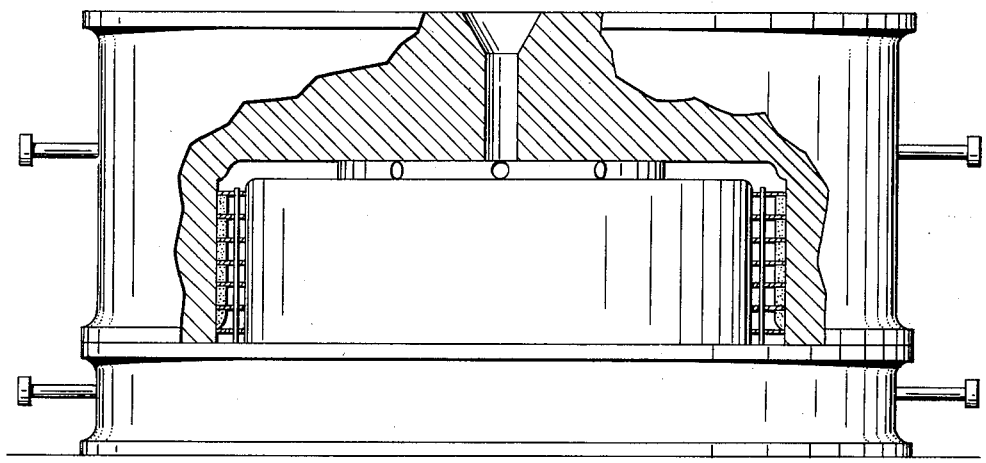
Figure 10:
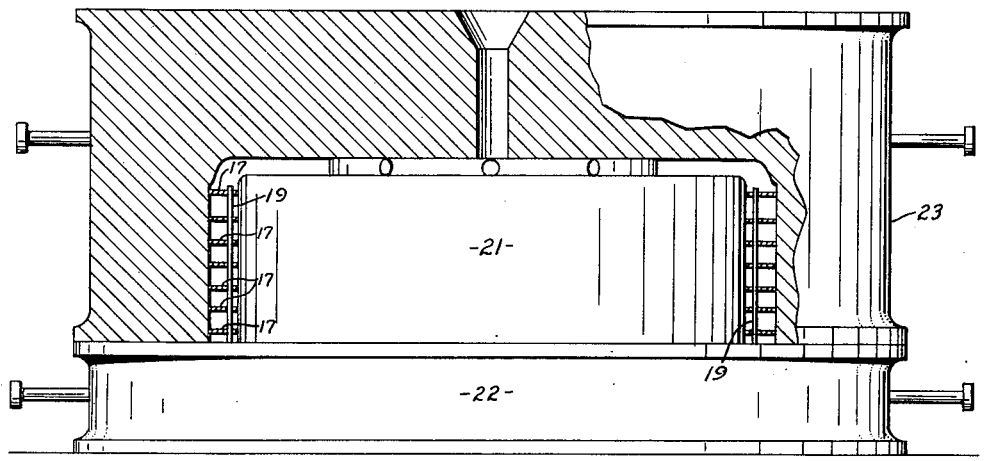
Figure 11:
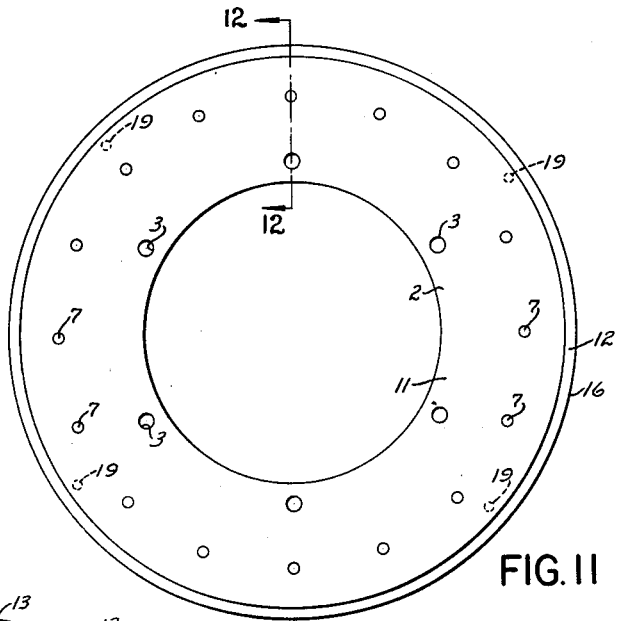
Figure 13:
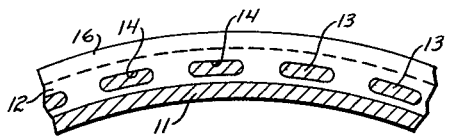
Figure 12:
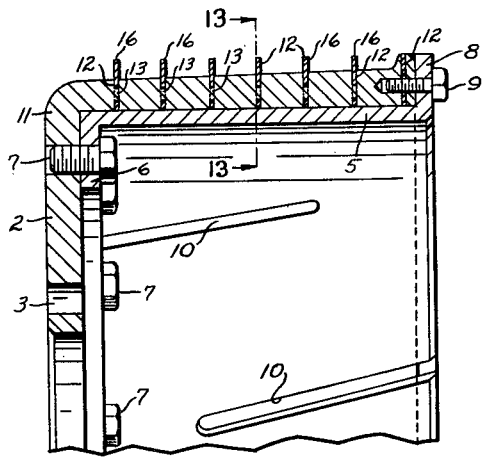
Figure 14:
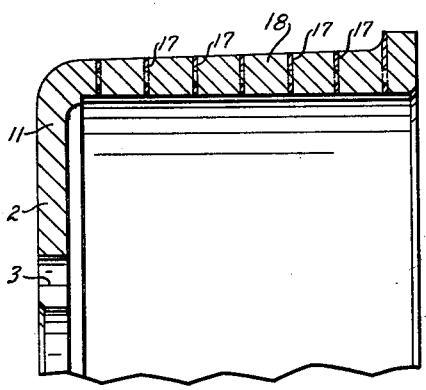

Fig. 5 is an axial sectional view of a forming box, showing an initial step in the preparation of ring inserts used in the molding of a brake drum, Fig. 6 is a top plan view of Fig. 5, Fig. 7 is a view similar to Fig. 5, showing the completed build-up of the ring inserts, Fig. 8 is a side elevation, in partial section, of the assembled ring inserts, after removal from the forming box of Fig. 7, Fig. 9 is a side elevation of assembled drag and cope molds, broken away to show the ring insert assembly in place, Fig. 10 is a view similar to Fig. 9, showing a modified form of ring insert assembly in place in the molds, Fig. 11 is an axial view of a completed brake drum as cast in the mold assembly of Fig. 9, Fig. 12 is a sectional view, taken on the line 12—12 of Fig. 11, Fig. 13 is a sectional view, taken on the line 13—13 of Fig. 12, and Fig. 14 is a view similar similar to Fig. 12, showing a portion of a brake drum, cast in the mold assembly of Fig. 10.

Referring to the drawings by characters of reference, there is shown a brake drum 1 of conventional cup shape having a radial flange 2 with perforations 3 for attachment to a wheel, and having a series of circumferential, integral cooling fins 4. Preferably the brake drum 1 will be composed of aluminum, to reduce weight and improve heat transfer.

Figure 1:
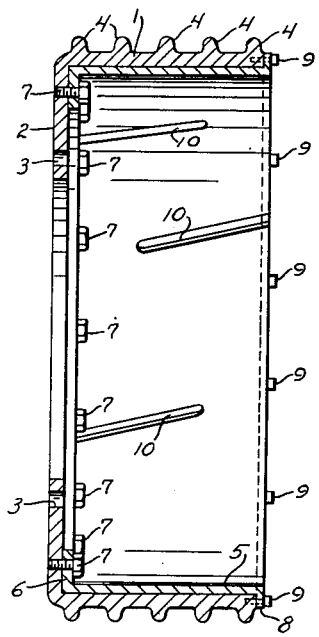
Fig. 1 is an axial sectional view of a lined brake drum.
Figure 2:
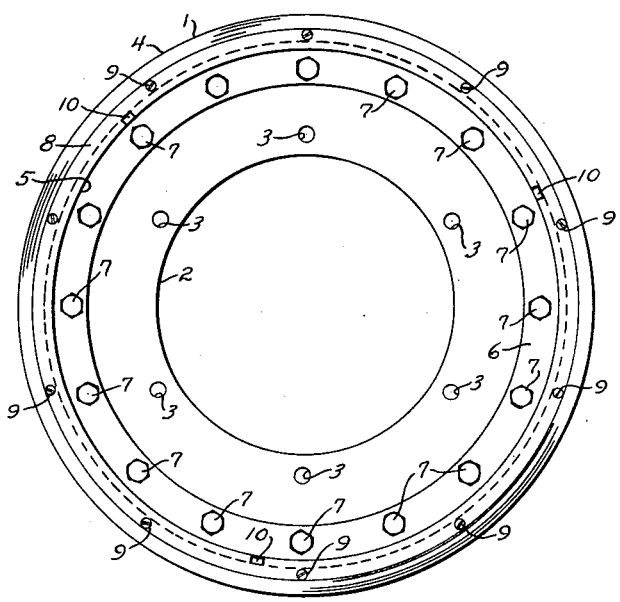
Fig. 2 is an elevational view of the drum as seen from the right of Fig. 1.
Figure 3:
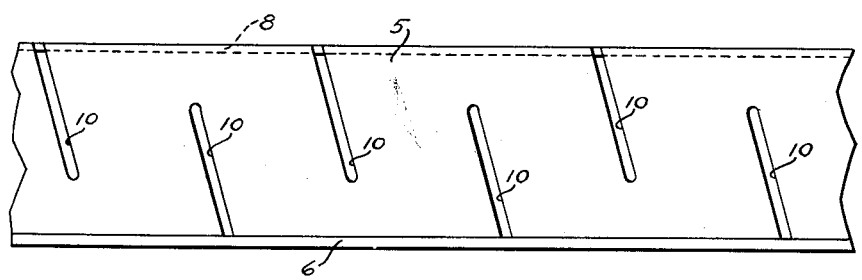
Fig. 3 is a development of the brake lining.
Figure 4:
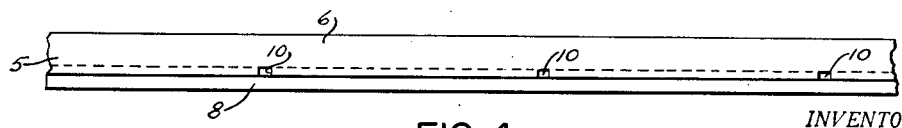
Fig. 4 is an edgewise view of the lining of Fig. 3.

Nested within the brake drum proper, is a liner 5, of iron alloy suitable for the purpose, as understood in the art. In order to extend the useful life of the brake drum proper, the liner is removably mounted on the drum. As seen in Fig. 1, the liner has a flange 6 nesting against flange 2 of the drum, and secured thereto by bolts 7. For further strength and stability, the liner also has, at its other edge, an outwardly turned flange 8, secured to the drum 1 by bolts 9.

The liner is provided with slots 10, formed alternately in the respective side edges thereof, extending somewhat beyond the center line of the band, generally transversely, but having a definite angle of inclination with respect to the planes of the edges of the liner.

By the angular relation of the slots, it will be seen that more room for expansion of the liner is provided for any given width of slot. This gives a desirable advantage without sacrificing useful frictional area. The slanted slots also provide improved ventilation for the brake parts, and are adapted to receive and eject dirt, metal dust, or other foreign matter which may collect between the shoe and drum.

While a particular angle of inclination of the slots has been illustrated, it will be understood that this angle may be varied within considerable limits without sacrificing the benefits of the invention.

The cooling effect may be improved by including, in the drum proper, integral inserts of material having a high rate of heat transfer, such as copper or aluminum. Drums of this type are shown in Figs. 12 and 14.

Referring to Fig. 12, the brake drum 11 has the same general configuration of the drum in Fig. 1, but instead of having fins homogeneous with the material of the drum, ring inserts 12, of copper are provided within the body of the drum, which latter is of conventional composition, such as cast steel. Continuity in the cast steel structure of the drum is provided in a series of webs 13, forming connecting bridges between annuli of the drum lying on opposite sides of the inserts 12. As will be explained, these webs are formed in the casting of the drum, the metal flowing, to various levels of the drum, through openings 14 in the ring insert, which openings may be generally elliptical in form. In the form shown in Fig. 12, the rings extend outwardly of the drum, providing circumferential fins 16, which improve heat transfer by direct contact of a large surface area with the atmosphere. The ring inserts preferably extend to, and are exposed at, the inner face of the drum, so that there is direct heat transfer from the liner 5 through the drum 11. The intimate bond between the inserts and the steel of the drum, also provides a ready outward path for heat in the drum passed from the liner to the steel of the drum, and reduces heat accumulation in the drum by conduction through the copper rings.

Fig. 14 shows an example wherein no liner is employed, and the inwardly exposed rings 17 carry heat directly from the brake bands through the drum 18. In this illustration the extending fins are omitted, but it will be understood that they may be included if desired.

In making drums of the types shown in Figs. 12 and 14, the ring inserts are first integrated into the framework they will occupy in the finished casting, and the assembly is then placed in the casting mold. Conveniently, the copper rings may be assembled into such a framework by means of spacer rods. The simplest case is that of Fig. 14, wherein the rings are coextensive in width with the drum proper. In Fig. 10, the rings 17 are shown assembled on spacer rods 19, which may be four in number, and distributed at 90° intervals circumferentially of the rings. To effect the connection, it is merely necessary to provide perforations in the rings, of such size as to receive the rods in a forced, friction fit. The rods are first mounted on one of the end rings, and thereafter the balance of the rings can be forced onto the rods and moved to the position giving the desired spacing between rings. The framework is then merely placed in surrounding relation to the central boss 21 of the cope mold 22, and the drag mold 23 is then placed in surrounding relation to the ring assembly. On pouring, the molten metal passes downwardly through openings 14 in the rings, so that the spaces between the rings, as well as the openings 14 are completely filled, and a solid body is formed, in which the rings are intimately united with the steel of the drum, and in which there are no complete discontinuities in the steel body such as might result in weaknesses, leading to cleavage.

The fins of the brake drum of Fig. 12 require somewhat more manipulation in the molding process. In order to block out the space between the outer wall of the drum and the outer edges of the fins, a ring of sand is built up in the ring assembly. This is conveniently performed stepwise. Referring to Fig. 5, any convenient, cylindrical receptacle 24, of wood for instance, is provided, in which the bottom ring 12 is inserted, together with the spacer rods 19, four of the latter being shown in this case. Secured in any convenient manner, to the base of receptacle 24, is a central boss 26, of stepped form with sections of successively reduced diameters, to provide shoulders 27 for the support of a series of centrally perforated disks, which are used to align pattern pieces, as will be explained.

The pattern pieces, which are used to build up a ring of sand at the outer zone of the ring insert network, are best seen in Fig. 6. Designed to form a ring when assembled, these comprise four pieces joined along a pair of parallel lines forming cords of the outer circle of the ring, and tangent to the inner circle of the ring. These lines are indicated at 28 and 29 in Fig. 6, the pattern pieces being indicated by the numerals 31, 32, 33 and 34. The outer perimeter of the ring is indicated at 36, and the inner edge at 37.

Since the pattern pieces, when assembled, extend into the spaces between adjacent copper rings 12, provision is made for moving pieces 34 radially of container 24 for placement or removal. To enable such movement, pieces 33 and 34 terminate at edges 38, somewhat removed from the center of the flat sides of pieces 31 and 32.

For spotting the ring shaped patterns, centrally perforated disks are employed. The lowermost of these disks is indicated at 39 in Fig. 5, and rests on the first shoulder 27 of the boss 26. With the pattern pieces 31—34 arranged in contacting relation with the peripheral edge of disk 39, the outer edges of these pieces will be properly spaced from the inner walls of container 24, providing the chamber for receiving the sand 41. The several pattern pieces are provided with slots 42 in their outer edges, to clear the rods 19 which space the copper rings.

The sand is inserted stepwise. Thus, at the stage shown in Fig. 5, the sand 41 is packed into the space between the pattern and the container. Then the next higher copper ring 12 is placed on the spacer rods and brought down onto the top of the pattern and sand. Thereafter, another set of pattern pieces (those visible in Fig. 7 being indicated as 33' and 34'), identical in form, as viewed in top plan, with the pieces 31—34 is superimposed on the said pieces, after which a spotting ring 43 is used to position the pieces, and another section of sand is packed into the outer chamber above the first section of sand. This process is repeated until the uppermost copper ring has been placed, with the result shown in Fig. 7. It should be noted that spotting rings 39 and 43—47 not only serve to position the pattern rings, but also afford a backing, to keep the pattern in place when the sand is packed. It is also to be noted that rods 19 restrain the pattern sections from moving outwardly of their proper position.

All pattern rings above the second such ring have parts identical with the respective parts of said second ring, but the respective spotting rings have successively smaller central openings for accommodation on the steps 27 of the central boss. The bottom pattern differs from the upper patterns, chiefly in being thicker, and in having an outer coved surface 48. The said bottom pattern is stepped, as at 49, due to the height of the bottom copper ring, and the upper patterns have similar steps, indicated at 51 having a depth equal to the thickness of the copper rings, so that each pattern may be in contact with adjacent patterns, when stacked.

Having formed the outer shell of sand, the first step in the dismantling process is the removal of the top spotting ring 47 by lifting it axially of the boss 26. For this purpose, arcuate openings 52 are provided in the several spotting rings for hand grasping. With ring 47 removed, top pattern sections 33' and 34' are moved toward the axis of the container 24, and lifted out. Thereafter, sections 31' and 32' may be moved toward the axis of the container and also lifted out. This process is repeated until all of the spotting rings and patterns have been removed, whereupon the assembly of copper rings, holding the shell of sand 41, is lifted out of container 24, and placed in the cope mold, as in Fig. 9. With the drag mold in place, the metal of the drum is poured, filling the spaces within the shell of sand 41. When the casting is taken out of the mold, and the shell of sand 41 removed, the result is a cast brake drum with the embedded rings extending outwardly to provide the fins or vanes 16.

While certain preferred embodiments of the invention have been shown and described, the invention is not limited thereby, since changes in the size, shape and arrangement, for instance, of the various parts may be resorted to, without, however, departing from the spirit or scope of the appended claims.

What is claimed is:

1. A composite brake drum comprising a main casting of shell form, a liner secured to the inner wall of said casting and having through slots opening from one edge and terminating short of the other edge, said slots being inclined at an angle with respect to a line perpendicular to the edge of said liner, elements extending generally transversely of the wall of said casting from the liner outward and composed of material having a heat conductivity higher than that of the main body of said casting, said elements having transverse openings therethrough and the main casting having bridge elements passing through said openings and providing continuity in said main casting.

2. A composite brake drum comprising ring-form elements having transverse openings and a matrix of shell form cast about said elements and filling said openings, a liner secured to the inner wall of said matrix and having through slots opening from one edge and terminating short of the other edge, said slots being inclined at an angle with respect to a line perpendicular to the edge of said liner, said elements extending from the liner outward and being of material having a higher heat conductivity factor than the material of said matrix.

3. A method of casting composite brake drums of shell form having perforated, transverse ring elements of higher heat conductivity than the main body of the drum, and protruding outwardly of the drum to form vanes, which comprises assembling said elements in axially superposed, spaced relation, inserting removable blocking means into the spaces between successive pairs of said elements in a zone radially inwardly of said elements, placing a temporary filler in the spaces between adjacent pairs of said elements, outwardly of said blocking means, removing said blocking means, placing the assembled elements, together with said filler, into a mold, introducing molten metal into the spaces between said elements, removing the solidified casting, and removing the said filler.

References Cited in the file of this patent

UNITED STATES PATENTS

| | | |
|---|---|---|
| 1,868,740 | Frank | June 26, 1932 |
| 1,974,905 | Walker | Sept. 25, 1934 |
| 2,095,719 | Sinclair | Oct. 12, 1937 |
| 2,332,330 | McMahan | Oct. 19, 1943 |
| 2,367,428 | Part Divi | Jan. 16, 1945 |
| 2,398,501 | Le Jeune | Apr. 16, 1946 |
| 2,430,936 | Kraft | Nov. 18, 1947 |
| 2,506,823 | Wyant | May 9, 1950 |
| 2,563,769 | Wyant | Aug. 7, 1951 |